United States Patent [19]
Grube

[11] 3,810,290
[45] May 14, 1974

[54] APPLICATION TOOL FOR PIERCE NUTS IN STRIP FORM

[75] Inventor: William L. Grube, Lake Bluff, Ill.

[73] Assignee: MacLean-Fogg Lock Nut Co., Mundelein, Ill.

[22] Filed: Sept. 18, 1972

[21] Appl. No.: 290,240

[52] U.S. Cl. .................. 29/208 D, 29/211 D
[51] Int. Cl. .................. B23p 19/04, B23q 7/10
[58] Field of Search ..... 29/211 D, 208 D, 417, 432, 29/432.1, 432.2, 212 D

[56] References Cited
UNITED STATES PATENTS
| | | | |
|---|---|---|---|
| 2,187,647 | 1/1940 | Double et al. | 29/208 D |
| 2,754,516 | 7/1956 | Gasstrom | 29/417 X |
| 3,405,436 | 10/1968 | Koett | 29/211 D |

Primary Examiner—Thomas H. Eager
Attorney, Agent, or Firm—Davis, McCaleb & Lucas

[57] ABSTRACT

Disclosed is a tool for advancing pierce nuts to a position under a punch which is to attach the nuts to a sheet of metal. The tool is constructed in a manner to advance the nuts to such position upon the upward or return stroke of the punch rather than upon the power stroke thereof, the power for advancing the nuts being derived from a preloaded resilient member incorporated into the tool. A feature of the tool is the locating of the nut under the punch by indexing from the trailing edge of the nut rather than from the leading edge to avoid the inadvertent cutting of fractions of successive nuts should the nuts be initially improperly positioned under the punch. Another feature is the narrowness of the tool housing which permits the simultaneous application of two or more closely spaced nuts to a sheet of metal.

11 Claims, 15 Drawing Figures

PATENTED MAY 14 1974 3,810,290

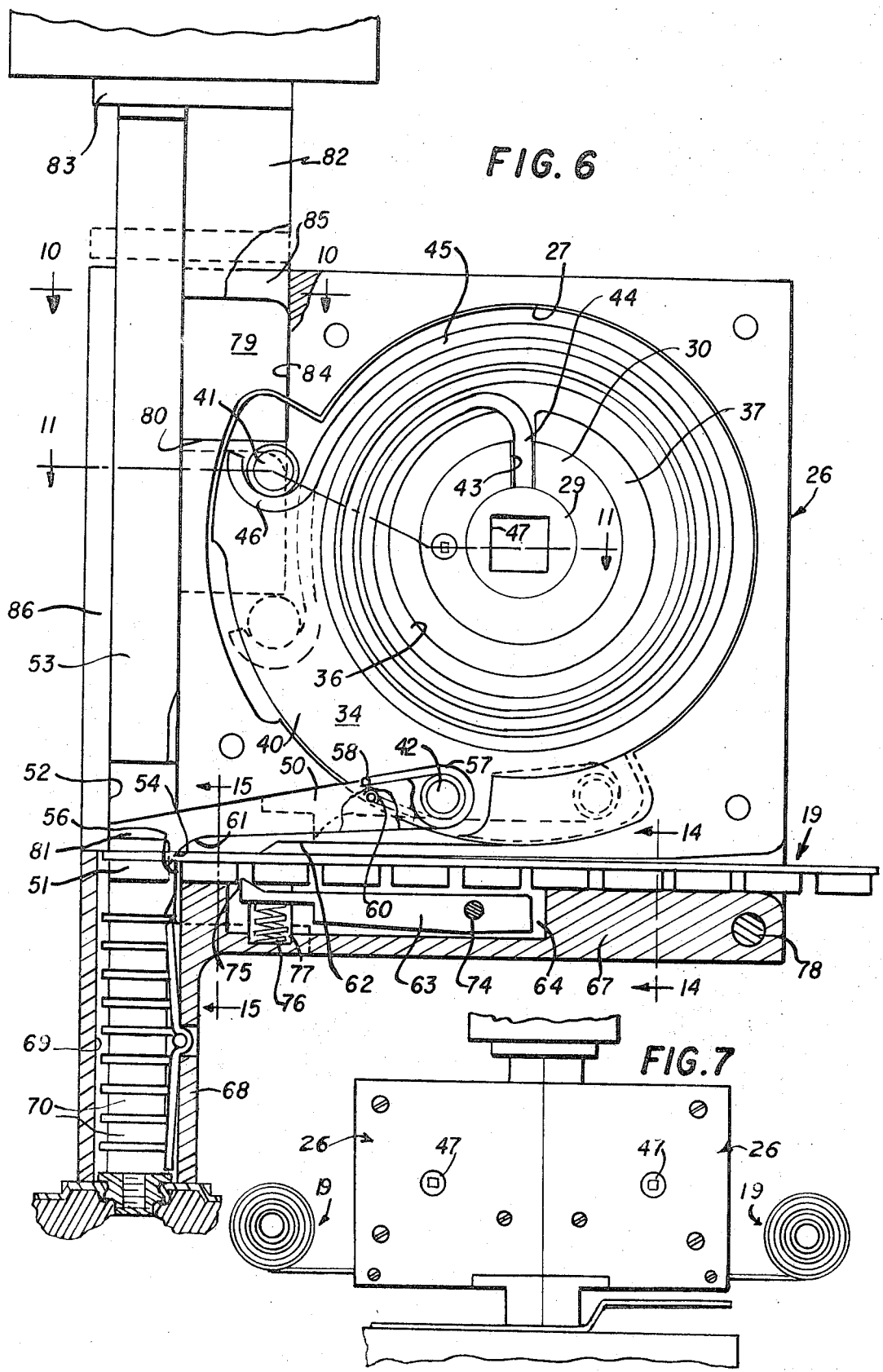

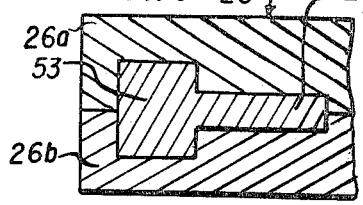
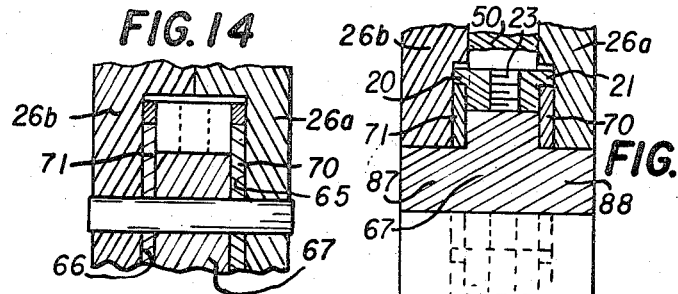
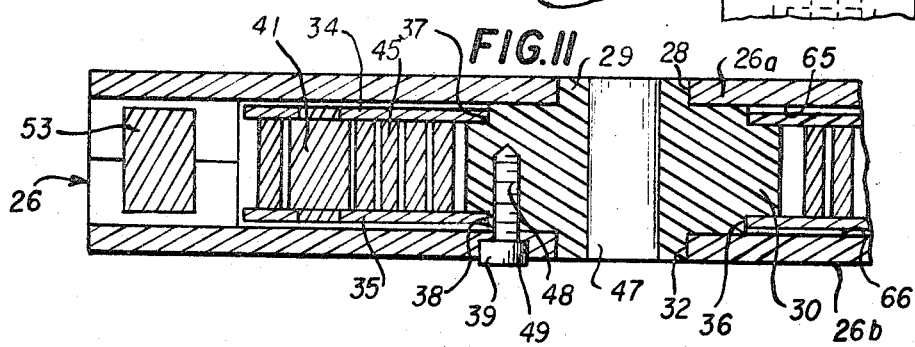
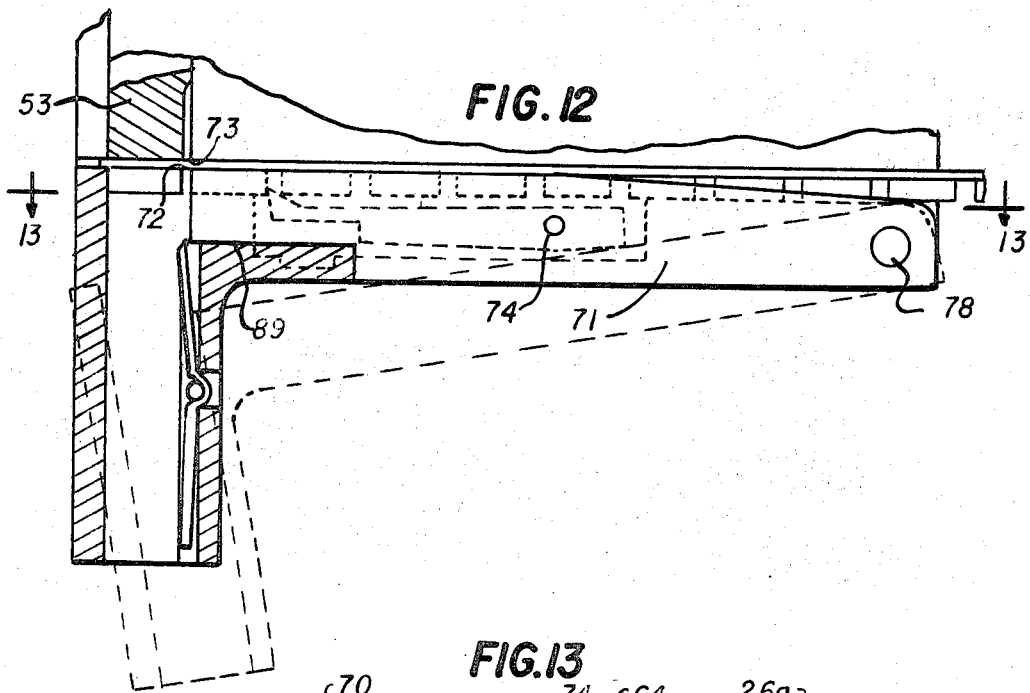
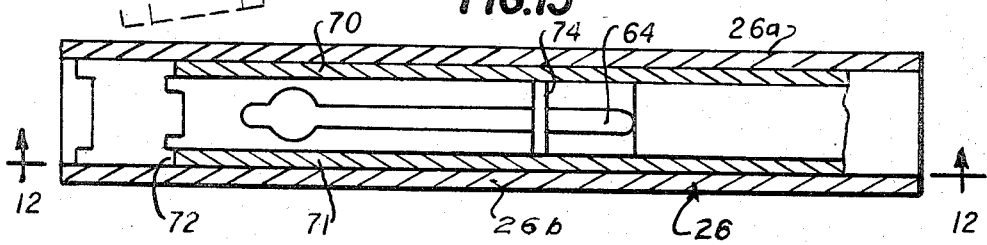

APPLICATION TOOL FOR PIERCE NUTS IN STRIP FORM

This invention relates to tools for applying pierce nuts to sheet material.

In my copending application Ser. No. 83,408, filed Oct. 23, 1970, for PIERCE NUT APPLYING METHOD AND TOOL, now abandoned, there is described a tool designed to feed pierce nuts to a punch which applies the nuts to a sheet metal panel or the like. In the form there shown, the nuts as fed to the punch are connected together in a continuous strip, the punch cutting off the end nut from the strip prior to applying it to the panel. It is also contemplated in my prior application that two or more such tools will be used simultaneously in one press to apply two or more nuts at the same time to a panel. In some instances the spacing between two nuts is less than the width of the tool of my aforesaid application, thus making it impossible to use that tool to apply closely spaced nuts simultaneously.

In another aspect of said prior tool the strip of nuts is advanced through the tool on the power or down stroke of the punch. Should a malfunction occur such that a nut or a fragment of a nut remains in the space under the punch while the strip is advanced to locate a new nut in that space, the full power of the punch behind the strip-advancing means can cause severe damage to the tool as the remnant of the nut occupying that space is crushed or forcibly ejected from the tool by the oncoming new nut.

It is an object of this invention to provide a nut-applying tool which is of the minimum possible width so that two tools may be placed side-by-side over a panel and made to apply nuts thereto simultaneously at a spacing between nuts substantially equal to the minimum allowable for the size of the nuts and the strength of the panel material.

Another object of this invention is to locate the punch of a nut-applying tool a minimum possible distance from one end of the tool so that two nuts can be applied simultaneously to a panel by locating two tools in line with their nut-applying ends adjacent one another and again achieve a minimum allowable spacing between the nuts applied by the tools.

A further object of this invention is the provision of a nut-applying tool for applying nuts from a continuous strip of nuts to a panel wherein the means for advancing the nuts through the tool is powered by a preloaded spring which is independent of the power stroke of the press or punch for applying the nuts to the panel.

It is also within the purview of this invention to provide means for advancing nuts under the punch in such manner that the advancing mechanism will be indexed from the rear of the nut and hence will be independent of the length of the nut, i.e., if the end nut is only a fragment of a nut, the punch will nevertheless correctly sever only the fragment from the strip so that the next nut will be a full nut and not fragments of two nuts and their connector.

These and other objects of this invention will become apparent from the following detailed description when taken together with the accompanying drawings of a preferred embodiment thereof in which:

FIG. 6 is a side elevational view of the tool of this invention with one side of the housing thereof removed to show the operative parts of the tool;

FIG. 7 is a view on a reduced scale showing two tools of this invention mounted in end-to-end relation;

FIG. 10 is a horizontal section through the tool of FIG. 6, the section being taken along line 10—10 of FIG. 6;

FIG. 11 is a section through the tool of FIG. 6 taken along line 11—11 thereof and looking in the direction of the arrows at the ends of said line 11—11;

FIG. 12 is a fragmentary elevational view of the lower part of FIG. 6 taken along line 12—12 of FIG. 13 showing one-half of the shearing mechanism of the tool;

FIG. 13 is a plan view in section of the lower part of the tool of FIG. 6 taken along line 13—13 of FIG. 12;

FIG. 14 is a fragmentary section through the tool taken along line 14—14 of FIG. 6; and FIG. 15 is a fragmentary section through the tool taken along line 15—15 of FIG. 6.

Figure 1:
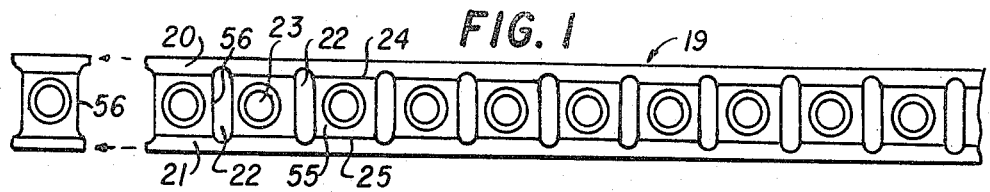
FIG. 1 is a plan view of a strip of nuts of the kind to which this invention is particularly applicable.
Figure 2:
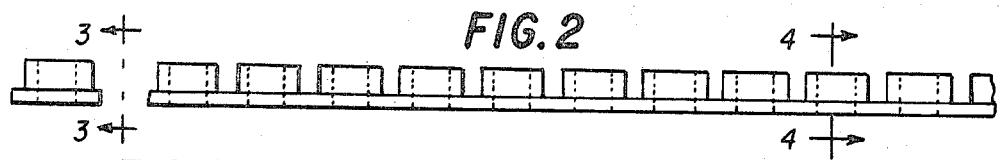
FIG. 2 is a side elevational view of the strip of FIG. 1.
Figures 3, 4:
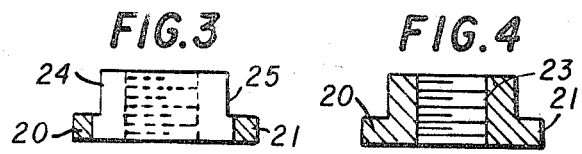
FIGS. 3 and 4 are enlarged transverse sections taken through the strip of FIG. 2 at 3—3 and 4—4, respectively, of FIG. 2.
Figures 5, 9:
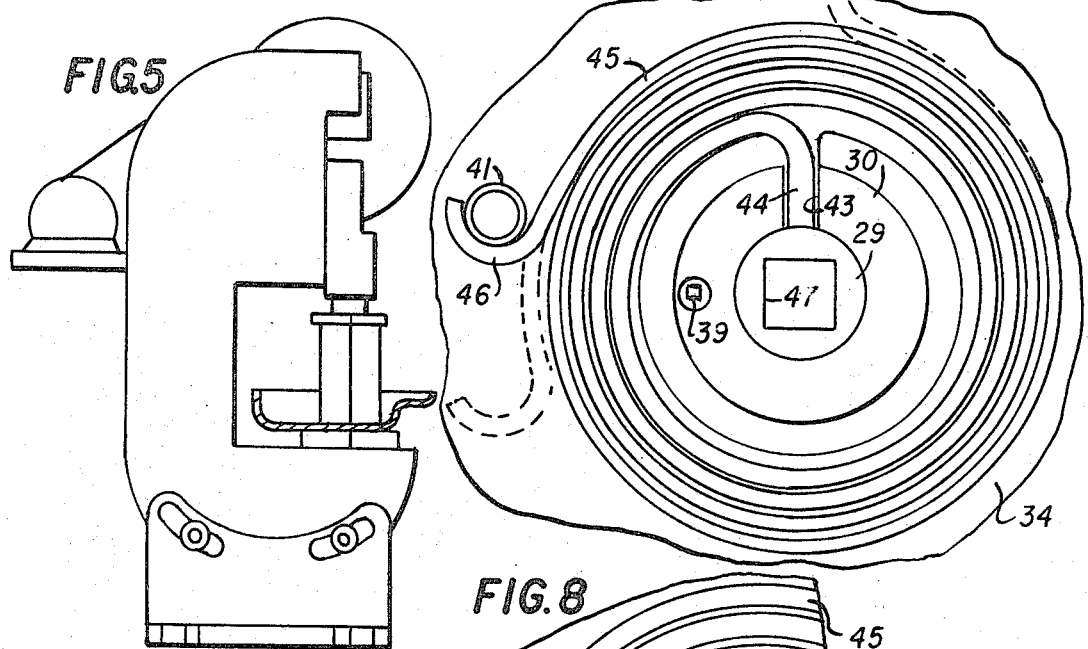
FIG. 5 is a side elevational view on a reduced scale of a press on which are mounted two of the tools of this invention in side-by-side relation.
FIG. 9 is a view of the power spring of FIG. 8 showing the spring in its preloaded operative condition.

In the preferred form selected to illustrate this invention, the tool is comprised of a narrow vertically split housing within which is mounted a clock type spring, i.e., a spirally wound torsion spring the inner end of which is anchored to the housing and the outer end of which bears against a pin connecting spaced pivoted plates, one plate being mounted on either side of the spring. The plates carry a second connecting pin on which is pivoted a pawl which engages the back of a nut of the strip of nuts to advance the strip toward a vertically reciprocable punch forming a part of the tool. The clock spring is torsionally preloaded to bear against the bottom of an anvil formed integrally with or fixed to the punch, so as to follow the punch upward in its return stroke. The pawl pivot is approximately 90° removed from the pin engaging the end of the spring, so that the pawl moves in a horizontal direction to urge the nuts toward the punch as the punch is moved upward on its return stroke, and moves in the opposite non-feeding direction on the power stroke of the punch. This bell crank effect of the plates reverses the direction of feed of the pawl relative to the power stroke of the punch so that the feed is effected solely by the power of the spring. This power is limited to the load-deflection characteristics of the particular spring used, and is independent of the power of the press in its closing direction.

The width of the tool is only that of the punch plus such thickness of the two sides of the housing as is required to supply rigidity and safety to the tool.

The nut-feeding pawl has an extension at the forward end thereof which is substantially of the same length as the corresponding dimension of a nut to be fed, said extension striking an abutment in the housing so located relative to the punch as to index the nut from the back of the nut and thus avoid repeatedly cutting off the strip at points other than at the connectors between nuts.

Referring now to the drawings for a detailed description of the invention, and particularly to FIGS. 1 to 4 inclusive showing the form of nut to which the tool of this invention is particularly well adapted, the nuts are supplied to the tool in the form of a rolled or extruded strip 19 of metal which has been formed with side flanges 20 and 21 and subsequently slotted as at 22 at spaced intervals equal in length to one of the dimensions of the finished nut. The strip has also been pierced and tapped at 23 between slots 22 to form the threaded opening of the nut. Slots 22 extend slightly beyond the top and bottom sides 24 and 25 (FIG. 3) of the nut and into the side flanges 20 and 21 to reduce the amount of connecting material between the nuts and to provide hinges or bending points for the strip to permit it to be supplied to a machine in coils. The amount of flexibility imparted to the strip is regulated by the amount of the flange material removed in the formation of the slots 22.

The tool by which the strip nuts of FIGS. 1 to 4 are applied to a sheet is shown in FIG. 6, the tool as there depicted having one side of the housing thereof removed to show the operative parts. The housing 26 is split vertically into two parts, one of the parts being shown at 26a and comprising a relatively rectangular machined part having a recess 27 of generally circular form and a concentrically disposed opening 28 (FIG. 11) through which extends the hub 29 of a spring holder 30.

As further shown in FIG. 11, the other part of the housing, 26b, has an opening 32 through which the opposite end of hub 29 extends so that spring holder 30 may oscillate or rotate within the openings 28 and 32 in the housing portions 26a and 26b, respectively.

Spring holder 30 is formed with shoulders 37, 38 so as to leave spaces on either side of the spring holder into which washer-like plates 34 and 35 may be placed. Said plates have openings 36 centrally located therein into which are received said shoulders 37 and 38 on spring holder 30. Plates 34 and 35 are substantially identical and pivot on the shoulders 37 and 38, respectively, adjacent spring holder 30. Said spring holder 30, as will be described more in detail hereinafter, is fixed to housing portion 26b by a screw 39 after the holder has been turned to "wind" the spring, and thus preload it.

Each plate 34 and 35 has a radially outwardly extending segment 40 (FIG. 6) and each recess 37 and 33 in the housing is shaped to accommodate these outward extensions. Said outwardly extending segments are connected together at one end by a pin 41 and at the other end thereof by a pin 42. Hub 29 has a radially extending slot 43 into which a radially inwardly bent end 44 of a spirally wound flat torsion or clock spring 45 is inserted. The opposite or outer end 46 of spring 45 is bent substantially in the form of a semi-circle and is hooked around pin 41.

Figure 8:
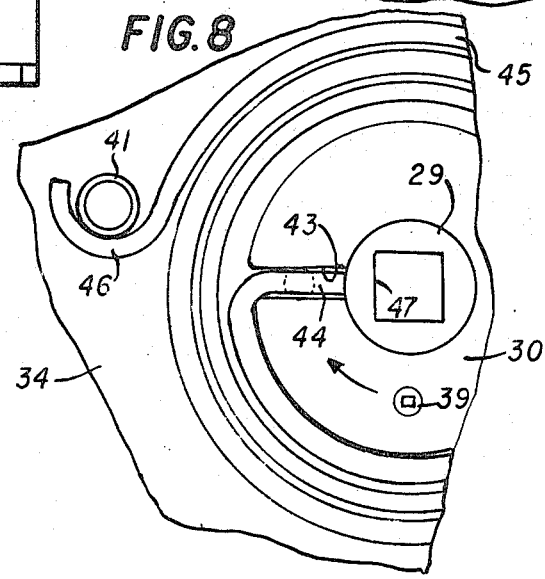
FIG. 8 is a fragmentary view of the power spring used in the tool, the spring being shown in its relaxed condition.

In the center of hub 29 is formed a square opening 47 into which a square ended wrench may be inserted. In its free state, spring 45 has its end 44 disposed in substantially radial alignment with its outer end 46 as shown in FIG. 8. It is contemplated, however, that the spring, when installed in the tool, will be under a predetermined torque load, i.e., it will be preloaded to a torque of sufficient magnitude to provide the necessary driving force for feeding nuts through the tool. This torsion or preload is established after spring 45, spring holder 30 and washer-like plates 34 and 35 are installed in housing portions 26a and 26b, by inserting a square-ended tool into square opening 47 and turning hub 29, its associated spring holder 30 and the thereinto inserted end 44 of spring 45 for approximately 90° of rotation. At this point, a threaded opening 48 in spring holder 30 will become aligned with an opening 49 in housing part 26b, and screw 39 is inserted into opening 49 and threaded opening 48 and secured in place. Approximately 90° of rotation of spring holder 30 relative to pin 41 suffices to establish the desired preload in the spring selected to illustrate this invention. It is understood that the degree of rotation will depend upon the spring characteristics and amount of preload desired.

A feed opening or track for the strip 19 is formed in the bottom of the housing by forming confronting elongated recesses 65 and 66 (FIG. 14) in the housing portions 26a and 26b respectively, said recesses then being partially filled by a pivoted bottom portion 67 (FIGS. 14 and 6) which extends across the entire housing and terminates in a downwardly directed rectangular extension 68. Said extension 68 has an opening 69 aligned with a guide opening 52 in which a punch 53 reciprocates, opening 69 receiving and accumulating nuts 70 as they are severed from the strip by punch 53. The strip 19, however, is supported in part by bottom portion 67 and in part by a pair of spaced shear plates 70, 71 disposed one on either side of portion 67 and extending under flanges 20 and 21, respectively, of strip 19.

Thus, as shown in FIG. 12, shear plate 71 has a sharp cutting edge 72 aligned with a correspondingly sharp cutting edge 73 on punch 53, both said cutting edges being disposed one over and the other under the flange 21 at the end of slot 22 between nuts so that said flange is severed by the punch. An identical shearing arrangement is provided between shear plate 70 and punch 53 to shear the opposite flange 20.

Although, as shown in FIG. 15, shear plates 70 and 71 are disposed in side-by-side relation to bottom portion 67, in the region of punch 53, as shown in FIG. 15, the forward portions of shear plates 70, 71 are solidly supported on lateral extensions of ears of bottom portion 67, which are of the same thickness as the adjacent housing parts 26a and 26b. Shear plates 70, 71, therefore, have their forward bottom regions notched rectangularly as shown at 89 in FIG. 12 to fit over and rest upon the lateral extensions 87 and 88.

It may be apparent that the rear portion of the strip 19 in the housing is supported by portion 67 and the front portion adjacent punch 52 is supported by shear plates 70 and 71.

The central region of pivoted portion 67 is notched as shown at 64 in FIG. 6. A latch 63, pivoted on portion 67 by a pin 74, has a nose 75 which is urged to enter the space between adjacent nuts in the strip by a spring 76 located in a separate spring recess 77 in portion 67 and thus prevents strip 19 from moving backwards out of the tool. Portion 67 is pivoted on a transverse pin 78 in housing parts 26a and 26b so that should a strip be jammed, or should nuts 70 be jammed in nose opening 69, the entire bottom portion of the housing can be swung downwardly as shown in dotted outline in FIG.

12 to expose the strip and nuts so that the malfunction can be corrected.

Pivoted on pin 42 on plates 34 and 35 is a pawl 50 the function of which is to engage strip 19 and urge it to the left as viewed in FIG. 6 to move an end nut 51 into guide opening 52 in which a punch 53 reciprocates. Said pawl 50 has a wedge-shaped protuberance 54 which is narrower than a slot 22 between adjacent nuts 55 so that it can enter a slot and engage the back surface 56 of a nut. A torsion spring 57 supported on pin 42 has one of its ends 58 bearing downwardly on pawl 50 as viewed in FIG. 6 and its opposite end 59 bearing against a notch 60 in the edge of radial extension 40 on plate 34.

Thus, if an oscillatory motion is imparted to plates 34 and 35, pawl 50 will be given a reciprocatory motion toward and away from guide opening 52 for punch 53. On the motion of pawl 50 toward the opening, torsion spring 57 will hold the wedge-shaped protuberance 54 of the pawl in a slot 22 (FIG. 1) between nuts and will do so with said protuberance bearing firmly against the rear side 56 of the nut. On the return stroke, that is, on the oscillation of the plates 34 and 35 in the opposite direction, a rounded portion 61 of the pawl cams the pawl out of the slot. During such return stroke the strip 19 is held against moving with pawl 50 by the previously described latch 63.

The oscillatory movement of plates 34 and 35 is generated by punch 53 as it reciprocates in its guide opening 52. As shown in FIGS. 6 and 10, punch 53 has formed integrally therewith an anvil 79 which is dimensioned to be received between plates 34 and 35, and which has a bottom surface 80 designed to engage pin 41. Thus as punch 53 moves downward in its guide opening 52, bottom surface 80 strikes pin 41 and moves said pin downward to the end of the stroke of said punch. The downward movement of pin 41 is converted into a rotary motion of plates 34 and 35 about stationary hub 30, pawl 50 being pulled back by this motion to the position shown in dotted outline in FIG. 6 out of the way of punch 53. During the said rotary movement of plates 34 and 35, spring 45 is deflected torsionally and loaded thereby above the initial preload thereon.

On the return or upward stroke of punch 53, plates 34, 35 are rotated in the opposite direction by spring 45 and pawl 50 is moved forward to engage a slot 22 between adjacent nuts to advance the end nut of strip 19 under punch 53. Movement of the wedge-shaped protuberance 54 or pawl 50 toward guide opening 52 is limited by an extension 81 on pawl 50 which contacts the forward wall of guide opening 52 when protuberance 54 has moved the slot between that nut and the next nut under the shear edges of the punch. Thus, should the end nut 51 be only a fraction of a nut with a portion of its forward part cut off by some prior malfunction of the tool or other cutting device, the fraction of a nut will be cut off and the next nut to be nut off will be a whole nut. Extension 81 thus forms a means for indexing the end nut relative to punch 53 from the rear face 56 of the nut.

It may be noted that pins 41 and 42 are disposed at approximately the same distance from the center of hub 30 so that the lineal distance travelled by pin 42 is the same as that travelled by pin 41. The latter pin, however, travels a linear distance approximately equal to the stroke of punch 53, and this distance is greater than the dimension of a nut 51 between slots, so that pawl 50 will move back over several nuts, thus creating the possibility of advancing more than one nut at a time toward recess 52 when there is room for only one nut. This situation is alleviated by forming a cam 62 in housing portions 26a and 26b which extends over strip 19 and under pawl 50 to prevent the pawl from engaging any but the last slot 22 in the strip nearest recess 52. The movement of pawl 50 rearwardly beyond the desired point of engagement with strip 19 is in this matter rendered harmless by cam 62.

The upper part of punch 53 above anvil 79 is strengthened by a web 82 formed integrally with punch 53 and extending between anvil 79 and an attaching flange 83 (FIG. 6). Housing parts 26a and 26b extend over a recess 84 therein in which anvil 79 reciprocates, to form a slot 85 through which web 82 extends and by which said web is guided. Said housing parts thus form a stop to prevent punch 53 from being ejected from the housing. Said stop, however, is so disposed that anvil 79 can move away from pin 41 when extension 81 on pawl 50 abuts against the forward wall of guide opening 52. This avoids any interference with the correct location of the end nut 51 by anvil 79.

In addition to permitting the placement of two tools side-by-side for close spacing of attached pierce nuts, the punch 53 in the present tool is located at the extreme end of the housing, leaving only enough thickness of wall 86 to provide adequate strength and rigidity to said wall. This then permits the placement of two tools in aligned end-to-end position in a press as shown in FIG. 7, or the placement of two pairs of side-by-side tools in end-to-end relation for the application to a panel of four pierce nuts in closely spaced relation.

It is understood that other springs in combination with bell cranks may be used instead of the clock spring shown herein to achieve the results described above. Coil springs of requisite strength, however, tend to be too large in diameter to fit into the narrow confines of housing parts 26a, 26b, but leaf springs and hydraulic springs, the latter in combination with appropriate levers are contemplated as alternative designs. It is understood, therefore, that the foregoing description is merely illustrative of a preferred embodiment of this invention and that the scope of this invention is not to be limited thereto but is to be determined by the appended claims.

I claim:

1. A tool for applying pierce nuts to a panel, said tool comprising a housing having guide means therein, a reciprocable punch disposed in said guide means and extending to the exterior of the housing for engagement with a reciprocable power source, a track in the housing intersecting the guide means for the punch and adapted to receive a series of aligned and similarly oriented pierce nuts therein, pawl means for urging the nuts along said track toward said guide means for the punch, resilient means for supplying power to the pawl means to urge the nuts toward said guide means, said resilient means being preloaded to supply power to the pawl means at all positions of said pawl means and being fixed at its one end to the housing and at its other end to said pawl means, and means connecting the pawl means and the punch for moving the pawl means away from the punch against the action of the resilient means when said punch is moving toward a pierce nut.

2. A tool as described in claim 1, said pierce nuts being spaced from one another, metallic means connecting said spaced nuts and maintaining the spacing between the nuts, and a shear plate in the track under said metallic connecting means and cooperable with said punch to shear the metallic connecting means.

3. A tool as described in claim 1, and means on said pawl for indexing a nut relative to the punch from a rear surface on the nut.

4. A tool as described in claim 3, said means for indexing said nut comprising an abutment on said pawl and adapted to contact a predetermined surface on the housing to arrest the pawl when the pawl has moved the said rear surface of said nut to a desired location relative to said punch.

5. A tool as described in claim 1, said resilient means comprising a spiral wound torsion spring, and means for preloading said spring.

6. A tool as described in claim 5, said means connecting the pawl means and the punch comprising means pivoted on said housing and having an abutment adjacent said punch, an anvil on said punch engageable by said abutment on the pivoted means, and means on the pivoted means angularly displaced from said abutment and pivotally supporting said pawl.

7. A tool as described in claim 5, said means connecting the pawl means and the punch comprising a pair of pivoted plates disposed one on each side of said torsion spring, means connecting both plates to cause them to move together, one end of said spring bearing against said connecting means, an abutment on the punch engageable by said connecting means, and a pin fixed to said plates and comprising the pivot for said pawl.

8. A tool as described in claim 1, said track comprising a pair of spaced shear plates supporting said nuts, means pivoting said shear plates on the housing, and a pivoted support on the housing for the shear plates, said housing having an opening therein through which the support and shear plates can pass, whereby access may be gained to said nuts in the tool by swinging said support and shear plates away from said nuts.

9. A tool as described in claim 8, said pivoted support for the shear plates extending under the punch and having an opening therein aligned with the punch through which sheared nuts may pass.

10. A tool as described in claim 9, said pivoted support having a downwardly directed hollow extension in which sheared nuts are accumulated and which serve to transmit the force of the punch to the bottom nut in the extension, both ends of said hollow extension being accessible when said support is rotated away from said housing.

11. A tool as described in claim 1, said resilient means comprising a spirally wound flat spring, a hub for said spring, said hub having a slot therein to receive the inner end of said spring, an opening in said housing for rotatably supporting the hub, means in the housing for limiting rotation of the outer end of said spring in an unwinding direction, and means fixing said hub to the housing angularly relative to the said outer end of said spring to preload said spring.

* * * * *

UNITED STATES PATENT OFFICE
CERTIFICATE OF CORRECTION

Patent No. 3,810,290  Dated May 14, 1974

Inventor(s) William L. Grube

It is certified that error appears in the above-identified patent and that said Letters Patent are hereby corrected as shown below:

Column 3, line 52: "37" should be -- 27 --

Column 4, line 47: "of ears" should be -- or ears --

Column 5, line 59: "nut off" should be -- cut off --

Column 4, line 43, "15" should be -- 14 -- .

Signed and sealed this 1st day of October 1974.

(SEAL)
Attest:

McCOY M. GIBSON JR.
Attesting Officer

C. MARSHALL DANN
Commissioner of Patents